H. S. NORMAND.
SNAP FASTENER.
APPLICATION FILED JUNE 26, 1919.
1,315,569. Patented Sept. 9, 1919.
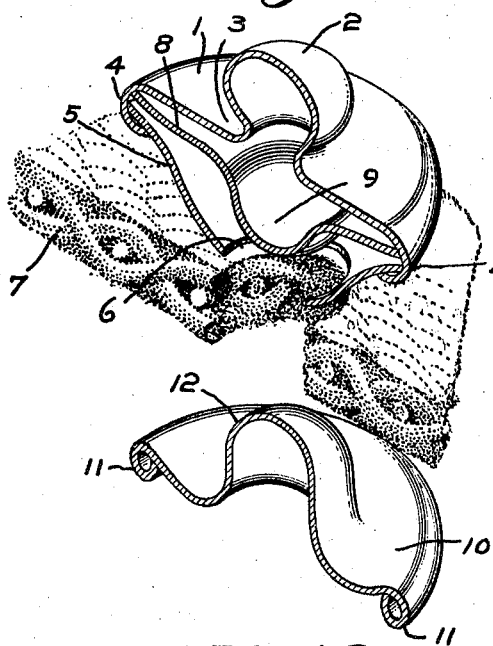
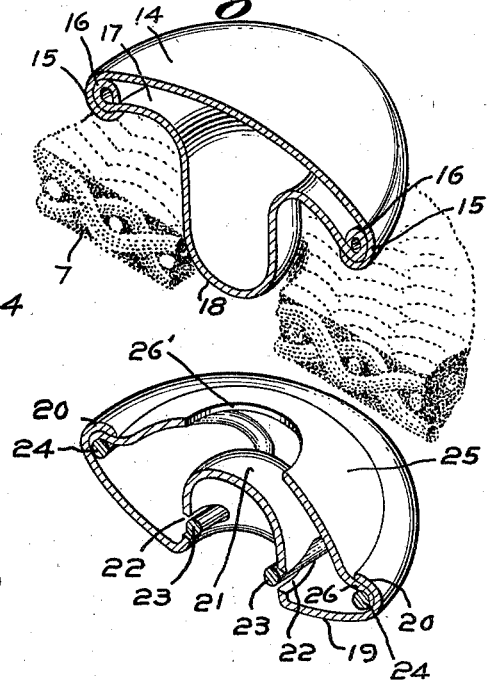
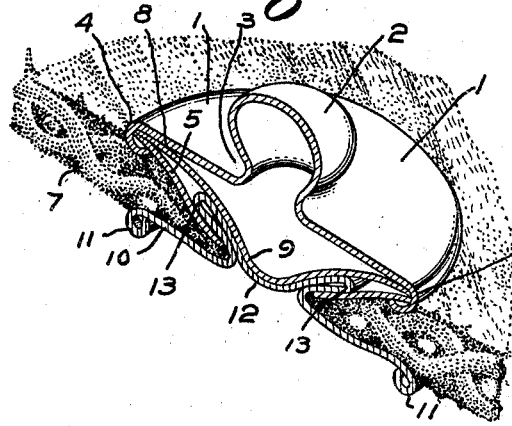
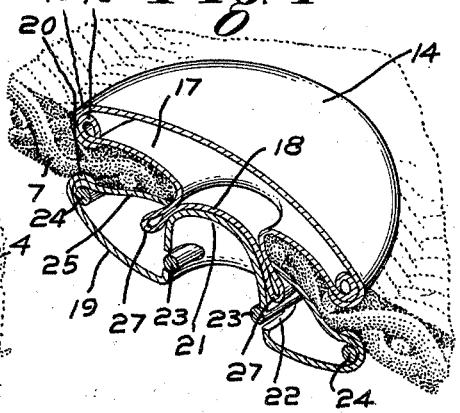
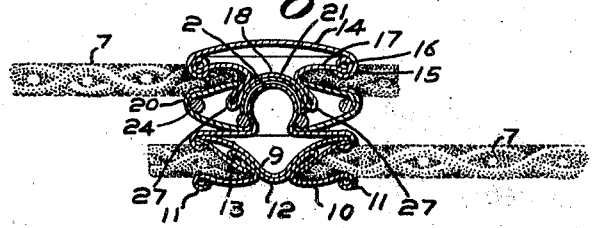
INVENTOR:
Henry S. Normand
BY
Robt P. Hams,
ATTORNEY

UNITED STATES PATENT OFFICE.

HENRY S. NORMAND, OF WATERBURY, CONNECTICUT, ASSIGNOR TO PENN RIVET CORPORATION, OF PHILADELPHIA, PENNSYLVANIA, A CORPORATION OF VIRGINIA.

SNAP-FASTENER.

1,315,569.   Specification of Letters Patent.   Patented Sept. 9, 1919.

Application filed June 26, 1919. Serial No. 306,891.

*To all whom it may concern:*

Be it known that I, HENRY S. NORMAND, a citizen of the United States, and a resident of Waterbury, county of New Haven, and State of Connecticut, have invented an Improvement in Snap-Fasteners, of which the following description, in connection with the accompanying drawings, is a specification, like characters on the drawings representing like parts.

The invention to be hereinafter described relates to separable buttons or snap fasteners, and the general object of the invention is to provide a simple, strong and cheap construction of this character, the two members of which may be readily applied to the material to which the fastener is to be secured, and conveniently engaged and disengaged, and in which the sections of the two members will not be liable to become accidentally disconnected, and therefore detached from the material by continued use.

A further feature of the present invention consists in forming the stud and socket members of the fastener, each of two sections, one of the sections of each having a relatively unyielding dome and the other having a relatively yielding dome whereby, when the sections of a member are assembled, one on each side of the material, the yielding material of the yielding dome will be spread by the unyielding material of the unyielding dome and serve to permanently connect the two sections together.

Other novel characteristics and combinations of the invention will be hereinafter described in connection with the accompanying drawings which show one good practical form of the invention, and then the invention in its true scope will be definitely stated by the claims.

In the drawings:

Figure 1 represents on a somewhat exaggerated scale, a perspective and sectional view of the stud member of a snap fastener and the fabric to which it is to be secured, the sections of the stud fastener being shown in separated relation.

Fig. 2 is a view similar to that of Fig. 1 showing the relation of parts when the two sections of the stud member have been forced together to cause the yielding dome to spread and permanently secure the member to the material.

Fig. 3 is a view similar to that of Fig. 1 but showing the socket member, the parts, as in Fig. 1, being illustrated in separated relation.

Fig. 4 is a view similar to that of Fig. 2 but showing the socket member with the sections thereof forced together to permanently secure the socket member to the material.

Fig. 5 is a sectional view showing the stud member and socket member connected together.

The two members composing the fastener are each formed of two main sections, one of which sections is disposed at one side of the material to which the fastener is to be secured, and the other section on the opposite side.

One of the sections of each member has a dome portion of relatively unyielding material, and the other main section of the same member on the opposite side of the material, has a dome formed of relatively yielding material, so that when the two sections of the fastener are assembled, as illustrated in Figs. 2 and 4, the yielding material of the yielding dome will be forced or spread into such relation with the companion dome as to cause the two sections of the member to be permanently secured to the material.

The term "material" as herein used, is employed in its broad sense and may be either a fabric, such as illustrated in the present instance of the invention, or it may be leather, or some other character of material. The snap fastener of the present invention is intended for use in connection with gloves, boots or shoes, or wearing apparel, in fact, in any relation where a snap fastener of its general type is or may be advantageously employed.

Referring to Fig. 1 of the drawings, the stud member, illustrated by this figure, comprises a disk or cap 1 having the stud 2 preferably stamped from the cap, said stud 2 forming one of the coöperating elements of the fastener which enable the fastener to hold together the parts of the material to be connected. Where the stud 2 joins the cap 1, a recess 3 is produced, which may advantageously serve to receive the usual snap spring, later to be described, carried by the socket member.

The circumferential edge portion of the cap 1 has an inturned flange 4 which receives within it the cover plate or disk 5 of somewhat irregular conical form and diverging from the cap plate 1. At its central portion the cover plate 5 is provided with an opening 6, the construction being such that when the parts are assembled on the material 7 the cover plate 5 at its portion extending from the flange 4, to the edge of the opening 6, will bear directly upon the material 7 and yet afford an opening through which may extend the relatively unyielding dome, now to be described.

Between the cover plate 5 and the cap 1 a dome plate 8 is engaged by the inturned flange 4, see Fig. 1. The dome plate 8 has its central portion formed with a dome 9 and the material of the dome plate and dome is of relatively unyielding character, as and for a purpose that will presently appear.

From the described construction it will be seen that the stud section of the stud member is self-contained and comprises the cap carrying the stud and the underlying cover plate between which and the cap there is disposed the dome plate 8 with the dome 9 thereof of relatively unyielding material, directly opposite the opening 6 in the cover plate.

The companion section of the stud member comprises a disk 10, Fig. 1, the circumferential edge of which may be properly strengthened in any desired manner, as by crimping or rolling it at 11. The disk 10 is provided with a relatively yielding dome. In the present instance the material of which the disk 10 is formed is more pliable or malleable than is the material of which the dome plate and dome 9 are formed, and in the present instance of the invention the yielding dome 12 is integrally formed with the disk 10 by stamping.

The two sections of the stud member are assembled relatively to the material to which the member is to be secured, as indicated in Fig. 1, and when the two sections of the stud member are forcibly moved in a direction of approach, the relatively unyielding dome 9 engages the top of the relatively yielding dome 12, and, as the two sections of the stud member are forced together, the yielding material of the dome 12 is spread into the condition indicated in Fig. 2 wherein it will be noted that the spread portions 13 of the yielding dome 12 flow into the space between the cover plate 5 and the dome plate 8 of the stud section, thereby forcing the cover plate 5 throughout its length into firm engagement with the material to which the fastener is secured and clamping the material between the cover plate and the disk 10.

The disk 10 is preferably formed of such size as to coöperate with the cover plate 5, as indicated in Fig. 2, to secure the section firmly in place, and since the material of the dome 9 is relatively unyielding it acts as a clamping means for permanently holding the relatively yielding material of the dome 12 in the spread condition indicated by Fig. 2.

The socket member of the fastening comprises two sections, one disposed at each side of the material to which the socket member is secured. In the present instance of the invention the socket member comprises a cap portion 14, Fig. 3, which is preferably formed as a disk or shell having a crimped or rolled edge 15. The surface of the cap 14 may, of course, be either plain or ornamented or provided with trade-mark indications, as circumstances dictate.

Seated within the inturned flange 15 of the cap 14 is the rolled edge 16 of a dome plate 17 provided with a dome 18, as indicated in Fig. 3.

The other section of the socket member comprises a socket plate 19, Fig. 3, having a turned over edge portion 20 and a central dome 21 which forms the socket portion of the fastener to receive the stud 2 hereinbefore described. The dome 21, which thus forms the socket of the fastener, may have its side portions recessed or cut, as at 22, for the passage of the spring 23 which may be secured to the socket member of the fastener in any suitable manner. In the present instance, the spring is provided with a body portion, as at 24, which is seated in the overturned edge portion 20 of the plate 19.

This section of the socket member is provided with a cover plate 25, Fig. 3, the circumferential edge portion of which, at 26, is received within the inturned edge 20 of the plate 19, and preferably between such edge and the body of the spring 24. The cover plate 25 has a central opening 26' through which is adapted to pass the dome 18 of the other section of the socket member when the parts are brought into assembled relation, as indicated in Fig. 4.

The parts being in the assembled relation, as indicated in Fig. 4, and the sections of the socket member being forced toward each other, the relatively yielding dome 18 engages the relatively unyielding dome 21, and, as the parts are forcibly moved toward each other, the material of the dome 18 is spread, as at 27, Fig. 4, into the space between the cover plate 25 and the plate 19, the construction being such that the spread portion 27 is clamped between the cover plate 25 and the unyielding dome or socket portion 21, similar in all respects to the clamping action of the spread yielding dome of the stud member, hereinbefore described.

Various changes may be made in the details and form of some of the parts without departing from the true scope of the present invention which is defined by the claims.

Claims—

1. A two part snap fastener comprising a stud member and a socket member each formed of two main sections disposed on opposite sides of the material to which the fastener is secured, one of the main sections of each member having a dome formed of relatively yielding material and the other main section of each member having a relatively unyielding dome to engage and spread the relatively yielding dome when the two main sections of said fastener are forced together.

2. A two part snap fastener comprising a stud member and a socket member each formed of two main sections disposed on opposite sides of the material to which the fastener is secured, one of the main sections of each member having a dome formed of relatively unyielding material and a cover plate interposed between the dome and material to which the fastener is attached, and the other of the main sections having a yielding dome adapted to be crushed or spread by the unyielding dome of the main section as the sections are forced together.

3. A two part snap fastener comprising a stud member and a socket member each formed of two main sections disposed on opposite sides of the material, one section of each member having an interlocking part of the fastener and provided with a relatively unyielding dome plate and dome secured to said section and a cover plate having a central opening, the other section of each member having a disk portion and a yielding dome adapted to be spread by the opposed unyielding dome of the first section when the parts are forced together, the material of the yielding dome acting on the cover plate to force it into locking engagement with the material.

4. In a snap fastener the combination of a stud section formed of a cap plate having a stud and inturned edge, a cover plate having a central opening and held by the inturned edge of the cap plate, a dome plate having a dome of relatively unyielding material and supported by the cap plate between the cover and cap with the dome opposite the central opening in the cover plate, and an opposed dome section formed of relatively yielding material adapted to be spread by the relatively unyielding dome of the stud section to flow the metal of the yielding dome into the space between the cover plate and unyielding dome.

5. A snap fastener comprising a cap plate having a stud and inturned edge, a cover plate having a central opening and secured to the inturned edge of the cap plate, a dome plate secured to the inturned edge of the cap plate and having a central unyielding dome opposite the central opening in the cover plate, an opposed dome plate having a relatively yielding dome and disposed on the opposite side of the material, the yielding dome being flattened by the unyielding dome as the parts are pressed together and entering the space between the cover plate and unyielding dome plate to permanently secure the fastener member to the material, and a coöperating socket member formed of two sections one of which has a yielding dome and the other an unyielding dome acting to spread the yielding dome when the sections are forced together.

In testimony whereof, I have signed my name to this specification.

HENRY S. NORMAND.

Copies of this patent may be obtained for five cents each, by addressing the "Commissioner of Patents, Washington, D. C."